United States Patent
Dai et al.

(10) Patent No.: US 8,867,331 B2
(45) Date of Patent: Oct. 21, 2014

(54) METHODS AND DEVICES FOR SENDING POSITIONING REFERENCE SIGNALS, FOR SENDING DATA AND FOR RECEIVING DATA

(75) Inventors: Bo Dai, Shenzhen (CN); Guanghui Yu, Shenzhen (CN); Zhisong Zuo, Shenzhen (CN); Yijian Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 270 days.

(21) Appl. No.: 13/259,387

(22) PCT Filed: Dec. 29, 2009

(86) PCT No.: PCT/CN2009/076195
§ 371 (c)(1),
(2), (4) Date: Sep. 23, 2011

(87) PCT Pub. No.: WO2010/145180
PCT Pub. Date: Dec. 23, 2010

(65) Prior Publication Data
US 2012/0033615 A1 Feb. 9, 2012

(30) Foreign Application Priority Data
Oct. 29, 2009 (CN) .......................... 2009 1 0209306

(51) Int. Cl.
*H04J 11/00* (2006.01)
*H04W 72/04* (2009.01)
*H04B 7/208* (2006.01)
*H04L 5/00* (2006.01)

(52) U.S. Cl.
CPC ............. *H04L 5/0053* (2013.01); *H04L 5/0007* (2013.01); *H04L 5/0048* (2013.01); *H04W 72/0446* (2013.01); *H04L 5/0044* (2013.01)
USPC ........... 370/208; 370/329; 370/336; 370/344; 370/252; 455/452.1; 455/456.1

(58) Field of Classification Search
CPC ..... H04W 72/04; H04W 88/08; H04W 76/00; H04W 72/0446; H04W 72/0453; H04W 72/044; H04W 72/0455; H04W 72/0413; H04W 72/042; H04B 2201/70701; H04B 2201/70702; H04B 2201/70718
See application file for complete search history.

(56) References Cited

U.S. PATENT DOCUMENTS

2009/0011767 A1 * 1/2009 Malladi et al. ................ 455/450
2010/0195566 A1 * 8/2010 Krishnamurthy et al. .... 370/328

(Continued)

FOREIGN PATENT DOCUMENTS

| CN | 101222272 A | 7/2008 |
|----|-------------|--------|
| CN | 101299634 A | 11/2008 |

(Continued)

OTHER PUBLICATIONS

ZTE, "Positioning PRS Design in LTE R9", 3GPP TSG RAN WG1#57, May 4-8, 2009, 10 pgs., San Francisco, USA.

(Continued)

*Primary Examiner* — Candal Elpenord
(74) *Attorney, Agent, or Firm* — Schiff Hardin LLP

(57) ABSTRACT

The present invention discloses methods for sending positioning reference signals (PRSs), for sending data and for receiving data. When PRSs and data carried by a physical downlink control channel (PDCCH) are required to be sent on a same physical resource, only the data carried by the PDCCH or the PRSs are sent on the same physical resource; or, when a sending end sends the PRSs and the data carried by the PDCCH on the same physical resource at the same time, a receiving end is made to ignore the received PRSs or the data carried by the PDCCH; or, the sending of the PRSs or the data carried by the PDCCH is limited so that they will not be sent on the same physical resource. The present invention also discloses devices for sending positioning reference signals, for sending data and receiving data. The present invention has solved the problem that the data carried by the PDCCH are in conflict with the PRSs over the fourth OFDM symbol when the PDCCH is sent over the first four OFDM symbols in the subframe, thereby ensuring the overall performance of the system.

4 Claims, 5 Drawing Sheets when PRSs and data carried by a PDCCH are required to be sent on a same physical resource, the data carried by the PDCCH are sent on the same physical resource, and no PRSs are sent on the same physical resource — S602

(56) References Cited

U.S. PATENT DOCUMENTS

| | | | |
|---|---|---|---|
| 2010/0260154 A1* | 10/2010 | Frank et al. | 370/336 |
| 2011/0158200 A1* | 6/2011 | Bachu et al. | 370/330 |
| 2011/0188460 A1* | 8/2011 | Malladi et al. | 370/329 |
| 2012/0020302 A1* | 1/2012 | Xiao | 370/328 |

FOREIGN PATENT DOCUMENTS

| | | |
|---|---|---|
| CN | 101534285 A | 9/2009 |
| EP | 1898542 A1 | 3/2008 |
| RU | 2310280 C9 | 11/2007 |
| RU | 2006143208 A | 6/2008 |
| WO | 2006099222 | 9/2006 |
| WO | 2008084624 A1 | 7/2008 |
| WO | 2008105267 | 9/2008 |

OTHER PUBLICATIONS

Huawei, "PRS in MBSFN subframe" 3GPP TSG RAN WG1 Meeting #58, Aug. 24-28, 2009, 4 pgs., Shenzhen, China.

International Search Report in international application No. PCT/CN2009/076195, mailed on Jul. 29, 2010.

Comments to LS on positioning subframe configuration for OTDOA. 3GPP TSG RAN WG1 Meeting #58, Shenzhen, China, Aug. 24-28, 2009.

Introduction of LTE positioning, 3GPP TSG-RAN WG1 Meeting #58, Shenzhen, China, Aug. 24-28, 2009.

Editorial corrections to 36.211, 3GPP TSG-RAN1 Meeting #58bis, Miyazaki, Japan, Oct. 12-16, 2009.

\* cited by examiner

Prior Art

Prior Art

Fig. 6 when PRSs and data carried by a PDCCH are required to be sent on a same physical resource, the data carried by the PDCCH are sent on the same physical resource, and no PRSs are sent on the same physical resource — S602

US 8,867,331 B2

METHODS AND DEVICES FOR SENDING POSITIONING REFERENCE SIGNALS, FOR SENDING DATA AND FOR RECEIVING DATA

TECHNICAL FIELD

The present invention relates to the field of communications, particularly to methods and devices for sending positioning reference signals (PRSs), for sending data and for receiving data.

BACKGROUND

A long term evolution (LTE) system is an important $3^{rd}$ generation partnership project. FIG. 1 shows a frame structure of a frequency division duplex (FDD) mode in an LTE system. As shown in FIG. 1, one 10 ms radio frame comprises twenty slots which are 0.5 ms long each and numbered from 0 to 19 respectively. Slot $2i$ and slot ($2i$+1) compose subframe i which is 1 ms long. When the LTE system adopts a subframe with a normal cyclic prefix, one slot contains 7 uplink/downlink signals; and when the LTE system adopts a subframe with an extended cyclic prefix, one slot contains 6 uplink/downlink signals. A resource element (RE) is a subcarrier in an orthogonal frequency division multiplexing (OFDM) symbol. FIG. 2 is a schematic diagram showing physical resource blocks in an LTE system of bandwidth 5 MHz based on relevant technologies. As shown in FIG. 2, when the LTE system adopts a subframe with a normal cyclic prefix, one downlink resource block (RB) comprises 12 sequential subcarriers and 7 sequential OFDM symbols; when the LTE system adopts a subframe with an extended cyclic prefix, one RB comprises 12 sequential subcarriers and 6 sequential OFDM symbols, which is 180 kHz in frequency domain and is the duration of one normal slot in time domain. Resource allocation is performed with a resource block as a basic unit.

The LTE system supports applications of 4-antenna multiple-input multiple-out-put (MIMO) system. The corresponding antenna ports #0, #1, #2 and #3 adopt full-bandwidth cell-specific reference signals (CRSs). When the cyclic prefix of a subframe is a normal cyclic prefix, the position of CRSs in the physical resource blocks is shown in FIG. 3; when the cyclic prefix of a subframe is an extended cyclic prefix, the position of CRSs in the physical resource blocks is shown in FIG. 4.

A base station needs to measure the position of a user equipment (UE) in a cell to configure and schedule the UE effectively. At present, the CRS is used to measure the UE, but due to the semi-static configuration of the power of CRSs, its UE positioning performance is limited. An existing solution for the above-mentioned problem is to implement positioning by sending PRSs so as to ensure the positioning precision of the UE. Period of sending PRS is 160 ms, 320 ms, 640 ms or 1280 ms. The number of successive subframes sending PRSs is 1, 2, 4 or 6. The time-frequency position of PRSs in the physical resource blocks is shown in FIG. 5, wherein the left figure shows the time-frequency position of PRSs when a physical broadcast channel adopts single-antenna and double-antenna ports for transmission, and the right figure shows the time-frequency position of PRSs when a physical broadcast channel adopts four-antenna ports for transmission.

A physical downlink control channel (PDCCH) can be transmitted over the first n OFDM symbols in one subframe. For a non-MBSFN (multimedia broadcast/multicast service single frequency network, MBSFN for short) subframe, when the downlink bandwidth is less than or equal to 10 resource blocks, n is 2, 3 or 4. Therefore, when the physical downlink control channel is transmitted over the first four OFDM symbols in the subframe, the data carried by the physical downlink control channel will be in conflict with the PRS over the fourth OFDM symbol, so that a solution is required to avoid such problem so as to ensure the overall performance of the system.

SUMMARY

The present invention is to solve the problem in existing technologies that, when a PDCCH is transmitted over the first four OFDM symbols in a subframe, the data carried by the PDCCH will be in conflict with PRSs over the fourth OFDM symbol. For this reason, the main object of the present invention is to provide methods and devices for sending PRSs, for sending data and for receiving data to solve the aforementioned problem.

To achieve the aforementioned object, a method for sending positioning reference signals (PRSs) is provided based on one aspect of the present invention, the method comprises: when PRSs and data carried by a physical downlink control channel (PDCCH) are required to be sent on a same physical resource, the data carried by the PDCCH are sent on the same physical resource, and no PRSs are sent on the same physical resource.

Preferably, the same physical resource may comprise the fourth orthogonal frequency division multiplexing (OFDM) symbol in a subframe.

To achieve the aforementioned object, a method for sending positioning reference signals (PRSs) is provided based on one aspect of the present invention, the method comprises: sending PRSs over predefined symbols in a subframe, wherein when a system adopts a normal cyclic prefix, a physical broadcast channel (PBCH) adopts single-antenna or double-antenna ports for transmission and the system bandwidth is less than or equal to 10 resource blocks, the predefined symbols may comprise at least one of the following: the sixth OFDM symbol, the seventh OFDM symbol, the ninth OFDM symbol, the tenth OFDM symbol, the eleventh OFDM symbol, the thirteenth OFDM symbol, and the fourteenth OFDM symbol; and when a system adopts a normal cyclic prefix, a physical broadcast channel (PBCH) adopts four-antenna ports for transmission and the system bandwidth is less than or equal to 10 resource blocks, the predefined symbols may comprise at least one of the following: the sixth OFDM symbol, the seventh OFDM symbol, the tenth OFDM symbol, the eleventh OFDM symbol, the thirteenth OFDM symbol, and the fourteenth OFDM symbol.

To achieve the aforementioned object, a method for sending data is provided based on another aspect of the present invention, the method comprises: when PRSs and data carried by a PDCCH are required to be sent on a same physical resource, the PRSs are sent on the same physical resource, and no data carried by the PDCCH are sent on the same physical resource.

Preferably, the same physical resource may comprise the fourth orthogonal frequency division multiplexing (OFDM) symbol in a subframe.

To achieve the aforementioned object, a method for sending data is provided based on another aspect of the present invention, the method comprises: sending data carried by a PDCCH over the first n OFDM symbols in a subframe, wherein for a non-MBSFN subframe, when a system adopts a normal cyclic prefix, the system bandwidth is less than or equal to 10 resource blocks and the subframe comprises PRSs to be sent, n may be 2 or 3.

To achieve the aforementioned object, a method for receiving data is provided based on another aspect of the present invention, the method comprises: only receiving predefined data when a sending end sends PRSs and data carried by a PDCCH on a same physical resource at the same time, wherein the predefined data may be the PRSs or the data carried by the PDCCH.

To achieve the aforementioned object, a device for sending PRSs is provided based on another aspect of the present invention, the device comprises a sending module; when PRSs and data carried by a PDCCH are required to be sent on a same physical resource, the sending module is arranged to only send data carried by the PDCCH on the same physical resource and send no PRSs on the same physical resource.

To achieve the aforementioned object, a device for sending data is provided based on another aspect of the present invention, the device comprises a sending module; when PRSs and data carried by a PDCCH are required to be sent on a same physical resource, the sending module is arranged to send the PRSs on the same physical resource and send no data carried by the PDCCH on the same physical resource.

To achieve the aforementioned object, a device for sending PRSs is provided based on another aspect of the present invention, the device comprises a sending module arranged to send PRSs over predefined symbols in a subframe; wherein: when a system adopts a normal cyclic prefix, a physical broadcast channel (PBCH) adopts single-antenna or double-antenna ports for transmission and the system bandwidth is less than or equal to 10 resource blocks, the predefined symbols may comprise at least one of the following: the sixth OFDM symbol, the seventh OFDM symbol, the ninth OFDM symbol, the tenth OFDM symbol, the eleventh OFDM symbol, the thirteenth OFDM symbol, and the fourteenth OFDM symbol; and when a system adopts a normal cyclic prefix, a physical broadcast channel (PBCH) adopts four-antenna ports for transmission and the system bandwidth is less than or equal to 10 resource blocks, the predefined symbols may comprise at least one of the following: the sixth OFDM symbol, the seventh OFDM symbol, the tenth OFDM symbol, the eleventh OFDM symbol, the thirteenth OFDM symbol, and the fourteenth OFDM symbol.

To achieve the aforementioned object, a device for sending data is provided based on another aspect of the present invention, the device comprises: a sending module arranged to send data carried by a PDCCH on first n OFDM symbols in a subframe, wherein for a non-MBSFN subframe, when a system adopts a normal cyclic prefix, the system bandwidth is less than or equal to 10 resource blocks and the subframe comprises PRSs to be sent, n may be 2 or 3.

To achieve the aforementioned object, a device for receiving data is provided based on another aspect of the present invention, the device comprises a receiving module arranged to only receive predefined data when a sending end sends PRSs and data carried by a PDCCH on a same physical resource at the same time; wherein the predefined data may be the PRSs or the data carried by the PDCCH.

The present invention can make the PRSs and the data carried by the PDCCH not be sent on the same physical resource by limiting the transmission of the PRSs or the data carried by the PDCCH, or make a receiving end ignore the received PRSs or the data carried by the PDCCH. The present invention has solved the problem that the data carried by the PDCCH are in conflict with the PRSs over the fourth OFDM symbol when the PDCCH is transmitted over the first four OFDM symbols in the subframe, thereby ensuring the overall performance of the system.

BRIEF DESCRIPTION OF THE DRAWINGS

FIG. 6 is a flow chart of a method for sending PRSs according to an embodiment of the present invention.

DETAILED DESCRIPTION

Figure 1:
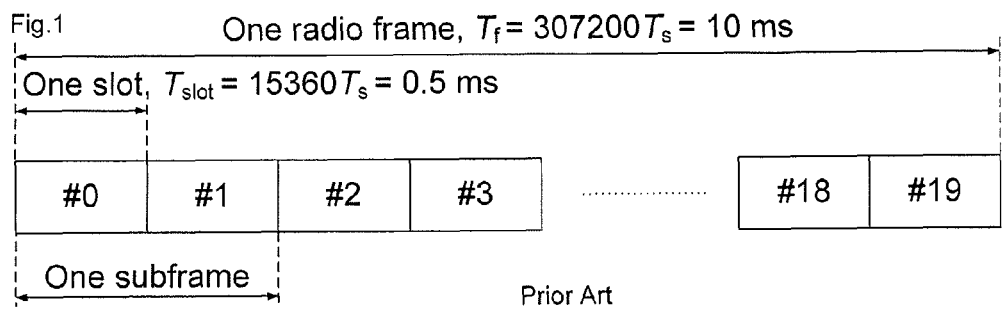
FIG. 1 is a schematic diagram showing a structure of a radio frame in an LTE system based on relevant technologies.
Figure 2:
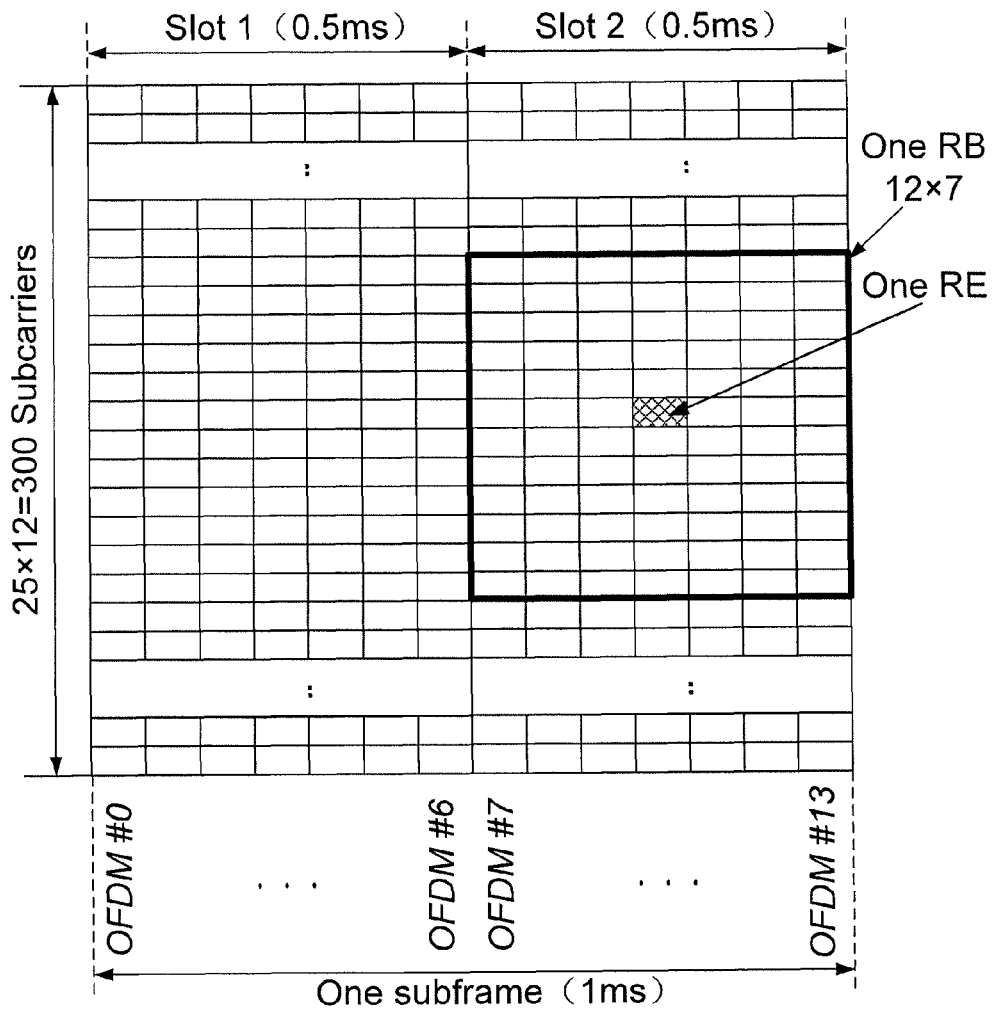
FIG. 2 is a schematic diagram showing physical resource blocks in an LTE system of bandwidth 5 MHz based on relevant technologies.

To address the problems in the existing technologies, the embodiments of the present invention provides a solution for sending positioning reference signals and data signals, and also provides a solution for receiving data. By making the PRSs and data carried by a PDCCH not be sent on a same physical resource, or making a receiving end ignore the received PRSs or the data carried by the PDCCH, the overall performance of the system is guaranteed.

The present invention will be described in details by using the drawings and the embodiments hereinafter. It should be noted that when there is no conflict, the embodiments in this application and the features in the embodiments may be combined with each other.

The present invention provides a method for sending PRSs. FIG. 6 is a flow chart of a method for sending PRSs according to an embodiment of the present invention. As shown in FIG. 6, the method comprises:

step S602: when PRSs and data carried by a PDCCH are required to be sent on a same physical resource, the data carried by the PDCCH are sent on the same physical resource, and no PRSs are sent on the same physical resource. Preferably, the same physical resource may comprise the fourth orthogonal frequency division multiplexing (OFDM) symbol in a subframe.

That is to say, when the PRSs and the data carried by the physical downlink control channel are sent on the same physical resource, no PRSs are sent on the same physical resource, in other words, the PRSs are discarded, or only the data carried by the physical downlink control channel are sent on the resource.

It should be noted that, the same physical resource may be the fourth orthogonal frequency division multiplexing (OFDM) symbol in the subframe, or may be other physical resource unit, and it may be at other positions. The corresponding processing method is the same as the processing method in step S602.

The present invention also provides a method for sending data, which comprises that: when PRSs and data carried by a PDCCH are required to be sent on a same physical resource, the PRSs are sent on the same physical resource, and no data carried by the PDCCH are sent on the same physical resource. Preferably, the same physical resource may comprise the fourth OFDM symbol in a subframe.

That is to say, when the PRSs and the data carried by the physical downlink control channel are sent on the same physical resource, no data carried by the physical downlink control channel are sent on the resource (i.e. the same physical resource), i.e. the data carried by the physical downlink control channel on the resource are discarded, or only the PRSs are sent on the resource.

The present invention also provides a method for sending PRSs, which comprises: sending PRSs over predefined symbols in a subframe, wherein when a system adopts a normal cyclic prefix, a physical broadcast channel (PBCH) adopts single-antenna or double-antenna ports for transmission and the system bandwidth is less than or equal to 10 resource blocks, the predefined symbols comprise at least one of the following: the sixth OFDM symbol, the seventh OFDM symbol, the ninth OFDM symbol, the tenth OFDM symbol, the eleventh OFDM symbol, the thirteenth OFDM symbol, and the fourteenth OFDM symbol; and when a system adopts a normal cyclic prefix, a physical broadcast channel (PBCH) adopts four-antenna ports for transmission and the system bandwidth is less than or equal to 10 resource blocks, the predefined symbols comprise at least one of the following: the sixth OFDM symbol, the seventh OFDM symbol, the tenth OFDM symbol, the eleventh OFDM symbol, the thirteenth OFDM symbol, and the fourteenth OFDM symbol.

Preferably, when the system adopts a normal cyclic prefix and the system bandwidth is less than or equal to 10 resource blocks or when data carried by a PDCCH are sent over the first four OFDM symbols in the subframe sending PRSs, or when the PRSs are sent in a relay backhaul type subframe, the PRSs are sent as per the aforementioned method.

This method avoids the conflict by limiting the sending of the PRSs. When the system adopts a normal cyclic prefix, the physical broadcast channel (PBCH) adopts single-antenna or double-antenna ports for transmission and the system bandwidth is less than or equal to 10 resource blocks, the PRSs are sent over the sixth, seventh, ninth, tenth, eleventh, thirteenth and fourteenth OFDM symbols in the subframe; and when the system adopts a normal cyclic prefix, the PBCH adopts four-antenna ports for transmission and the system bandwidth is less than or equal to 10 resource blocks, the PRSs are sent over the sixth, seventh, tenth, eleventh, thirteenth and fourteenth OFDM symbols in the subframe.

The present invention also provides a method for sending data, which comprises: sending data carried by a PDCCH over the first n OFDM symbols in a subframe, wherein for a non-MBSFN subframe, when a system adopts a normal cyclic prefix, the system bandwidth is less than or equal to 10 resource blocks and the subframe comprises PRSs to be sent, n is 2 or 3.

This method avoids the conflict by limiting the sending of the physical downlink control channel. The physical downlink control channel is sent over the first n OFDM symbols in the subframe. Preferably, for the non-MBSFN subframe, when the system adopts the normal cyclic prefix, the system bandwidth is less than or equal to 10 resource blocks and the subframe comprises the PRSs to be sent, n is 2 or 3.

The present invention also provides a method for receiving data, which comprises: only receiving predefined data when a sending end sends PRSs and data carried by a PDCCH on a same physical resource at the same time, wherein the predefined data is the PRSs or the data carried by the PDCCH. Preferably, the same physical resource may comprise the fourth OFDM symbol in a subframe, in other words, when the PDCCH is sent over the first four OFDM symbols in the subframe, a UE may assume that there are no PRSs to be sent over the fourth OFDM symbol in the subframe, so that it only receives the data carried by the PDCCH; or a UE may assume that there are no data carried by the PDCCH to be sent over the fourth OFDM symbol in the subframe, so that it only receives the PRSs.

In the following, the realizing process of embodiments of the present invention will be described in details.

Embodiments

This embodiment describes the process in which PRS sequence mapping is done in such a manner that mapping is started from the first OFDM symbol among the predefined symbols.

Figure 3:
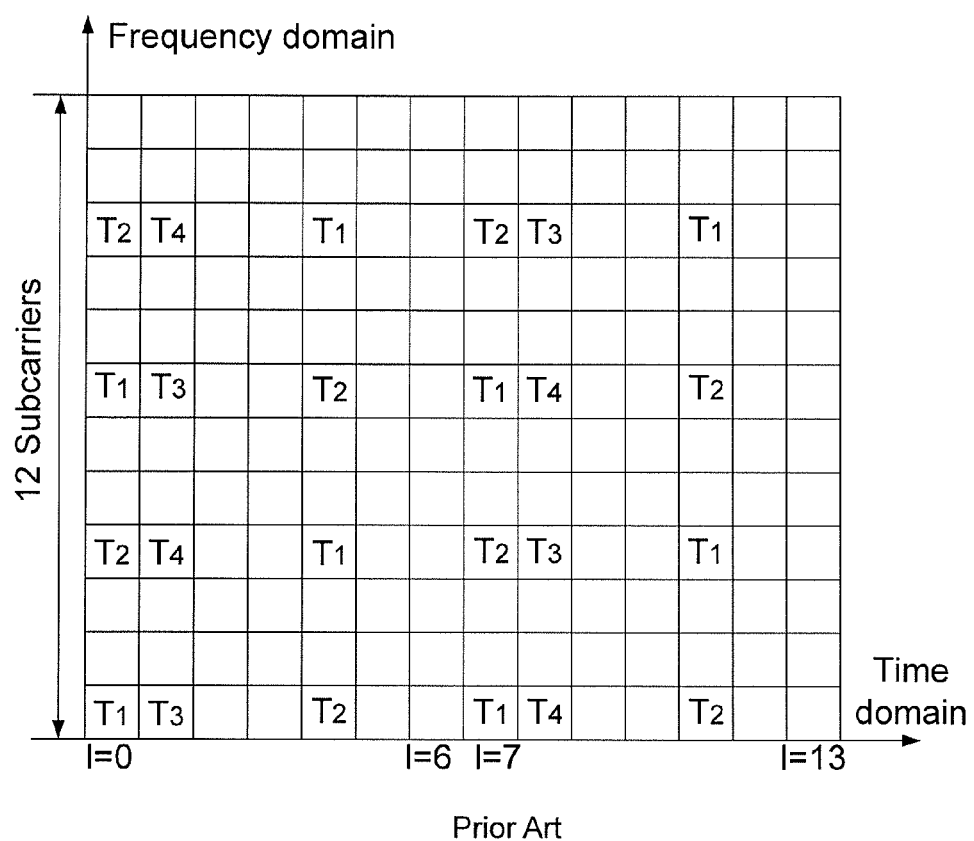
FIG. 3 is a schematic diagram showing the position of cell-specific reference signals in physical resource blocks for an LTE system with a normal cyclic prefix based on relevant technologies.
Figure 4:
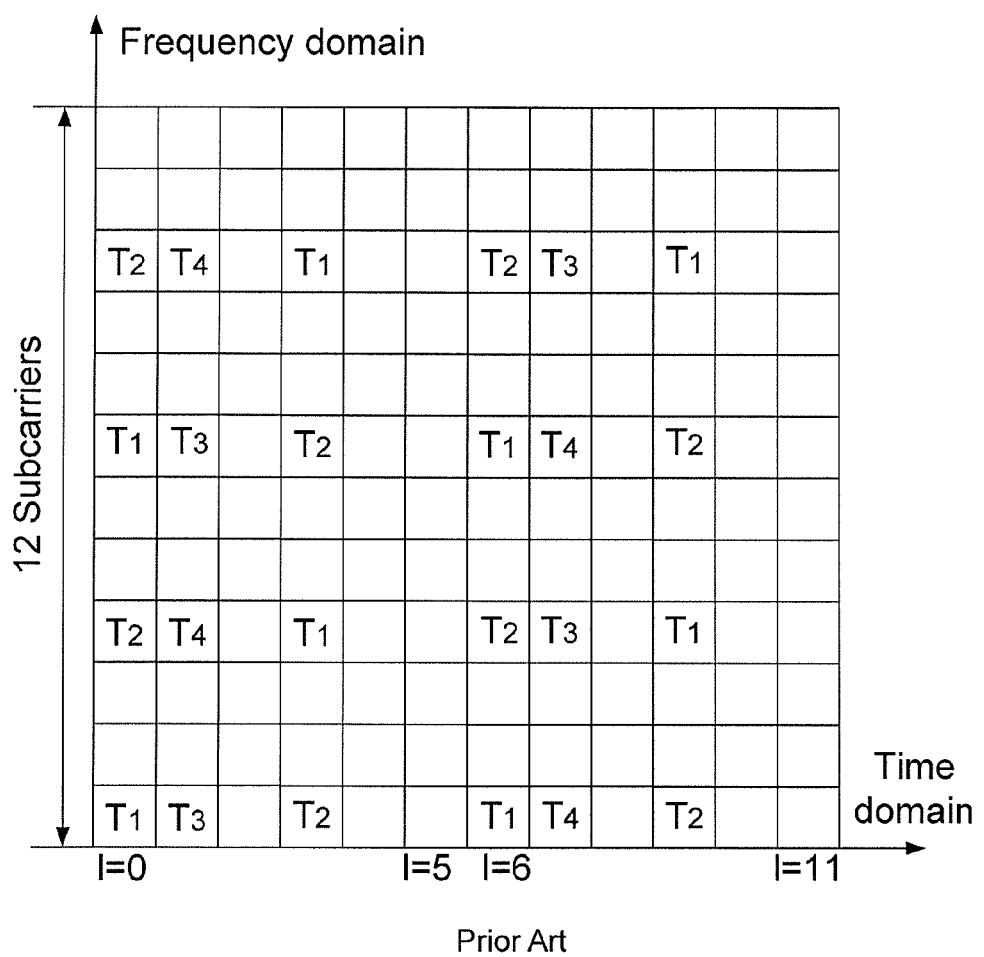
FIG. 4 is a schematic diagram showing the position of cell-specific reference signals in physical resource blocks for an LTE system with an extended cyclic prefix based on relevant technologies.
Figure 5:
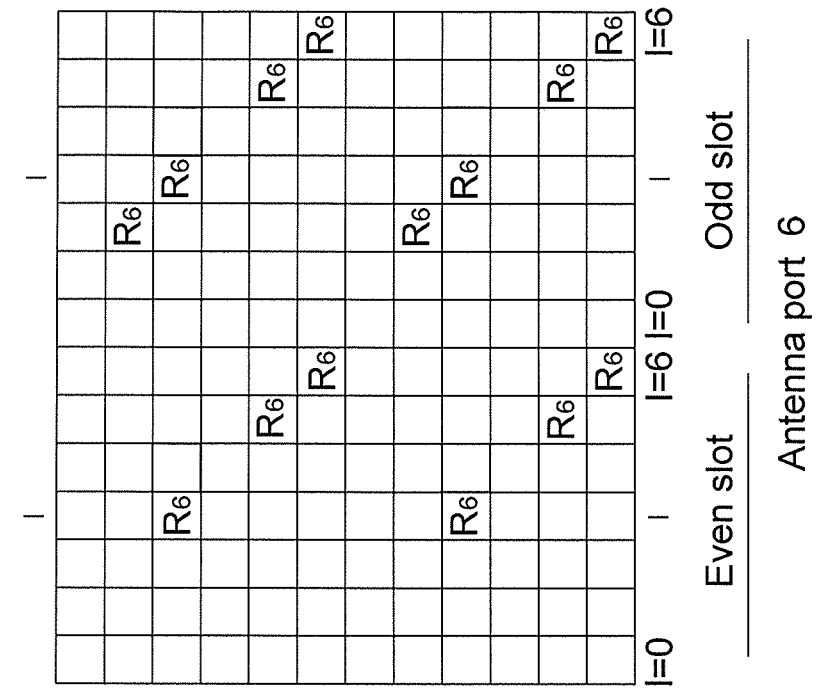
FIG. 5 is a schematic diagram showing the position of PRSs in physical resource blocks based on relevant technologies.
Figure 5:
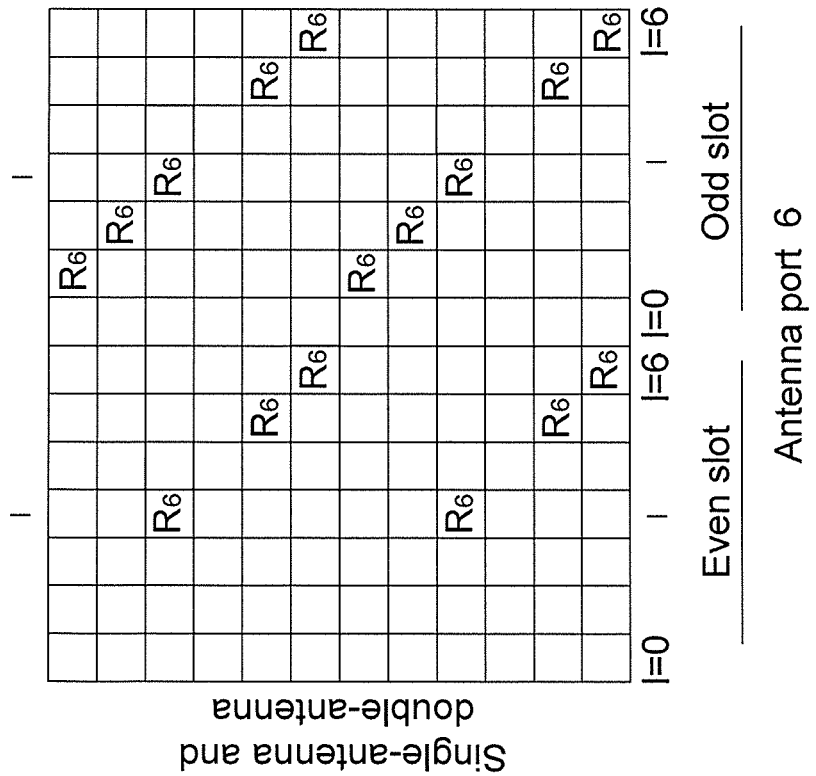

When a system adopts a normal cyclic prefix, a PBCH adopts single-antenna or double-antenna ports for transmission and the system bandwidth is less than or equal to 10 resource blocks, PRSs are sent over the sixth, seventh, ninth, tenth, eleventh, thirteenth and fourteenth OFDM symbols in a subframe (corresponding to OFDM symbols with OFDM symbol indexes 5, 6, 8, 9, 10, 12 and 13 as shown in FIG. 3); and when a system adopts a normal cyclic prefix, a PBCH adopts four-antenna ports for transmission and the system bandwidth is less than or equal to 10 resource blocks, PRSs are sent over the sixth, seventh, tenth, eleventh, thirteenth and fourteenth OFDM symbols in a subframe (corresponding to OFDM symbols with OFDM symbol indexes 5, 6, 9, 10, 12 and 13 as shown in FIG. 4).

The specific mapping process is shown as follows.

A PRS sequence $r_{l,n_s}(m)$ is defined as per the following formula:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1.$$

Wherein $n_s$ is an index of a slot in one radio frame, l is an index of an OFDM symbol in one slot, and $N_{RB}^{max,DL}$ represents the maximum bandwidth of the system.

The formula for generating a pseudorandom sequence C(i) is defined as follows:

$$c(i) = (x_1(i+N_C) + x_2(i+N_C)) \bmod 2$$

$$x_1(i+31) = (x_1(i+3) + x_1(i)) \bmod 2$$

$$x_2(i+31) = (x_2(i+3) + x_2(i+2) + x_2(i+1) + x_2(i)) \bmod 2$$

wherein $N_C = 1600$, $x_1(0) = 1$, $x_1(n) = 0$, $n = 1, 2, \ldots, 30$, $x_2$ is generated according to the initial value of the pseudorandom sequence $c_{init} = \sum_{n=0}^{30} x_2(n) \cdot 2^n$, and the $c_{init}$ calculated as per the following formula generates the pseudorandom sequence c(i) for each OFDM symbol:

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $$N_{CP} = \begin{cases} 1 & \text{if the cyclic prefix is a normal cyclic prefix} \\ 0 & \text{if the cyclic prefix is an extended cyclic prefix} \end{cases}$$

Mapping the PRS sequence $r_{l,n_s}(m)$ to a multiple modulating symbol $a_{k,l}^{(p)}$ of an antenna port p in a slot $n_s$ as per the following formula:

$a_{k,l}^{(p)} = r_{l,n_s}(m')$, wherein k is an index of a subcarrier on the OFDM symbol l.

When the cyclic prefix of the system is a normal cyclic prefix:

$$k = 6m + (6 - l + v_{shift}) \bmod 6$$

$$l = \begin{cases} 5, 6 & \text{if } n_s \bmod 2 = 0 \text{ and } n_{PDCCH} = 4 \\ 3, 5, 6 & \text{if } n_s \bmod 2 = 0 \text{ and } n_{PDCCH} \neq 4 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3) \end{cases}$$

$$m = 0, 1, \ldots, 2 \cdot N_{RB}^{PRS} - 1$$

$$m' = m + N_{RB}^{max,DL} - N_{RB}^{PRS}$$

wherein $N_{RB}^{max,DL}$ is the maximum downlink bandwidth, and $n_{PDCCH}$ is the number of OFDM symbols in the current subframe for transmitting the physical downlink control channel; and when the cyclic prefix of the system is an extended cyclic prefix:

$$k = 6m + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (p = 0, 1) \\ 2, 4, 5 & \text{if } n_s \bmod 2 = 1 \text{ and } (p = 0, 1, 2, 3) \end{cases}$$

$$m = 0, 1, \ldots, 2 \cdot N_{RB}^{PRS} - 1$$

$$m' = m + N_{RB}^{max,DL} - N_{RB}^{PRS}$$

wherein, $v_{shift} = N_{Cell}^{ID} \bmod 6$.

Alternatively, the PRS sequence $r_{l,n_s}(m)$ is defined as per the following formula:

$$r_{l,n_s}(m) = \frac{1}{\sqrt{2}}(1 - 2 \cdot c(2m)) + j \frac{1}{\sqrt{2}}(1 - 2 \cdot c(2m+1)),$$

$$m = 0, 1, \ldots, 2N_{RB}^{max,DL} - 1.$$

Wherein $n_s$ is an index of a slot in one radio frame, l is an index of an OFDM symbol in one slot, and $N_{RB}^{max,DL}$ represents the maximum bandwidth of the system. The formula for generating a pseudorandom sequence c(i) is defined as follows:

$$c(i) = (x_1(i + N_C) + x_2(i + N_C)) \bmod 2$$

$$x_1(i + 31) = (x_1(i + 3) + x_1(i)) \bmod 2$$

$$x_2(i + 31) = (x_2(i + 3) + x_2(i + 2) + x_2(i + 1) + x_2(i)) \bmod 2$$

wherein $N_C = 1600$, $x_1(0) = 1$, $x_1(n) = 0$, $n = 1, 2, \ldots, 30$, $x_2$ is generated according to the initial value of the pseudorandom sequence $c_{init} = \sum_{n=0}^{30} x_2(n) \cdot 2^n$, and the $c_{init}$ calculated as per the following formula generates the pseudorandom sequence c(i) for each OFDM symbol:

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

wherein $$N_{CP} = \begin{cases} 1 & \text{if the cyclic prefix is a normal cyclic prefix} \\ 0 & \text{if the cyclic prefix is an extended cyclic prefix} \end{cases}$$

Mapping the PRS sequence $r_{l,n_s}(m)$ to a multiple modulating symbol $a_{k,l}^{(p)}$ of an antenna port p in a slot $n_s$ as per the following formula: $a_{k,l}^{(p)} = r_{l,n_s}(m')$, wherein k is an index of a subcarrier on the OFDM symbol l.

When the cyclic prefix of the system is a normal cyclic prefix:

$$k = 6m + (6 - l + v_{shift}) \bmod 6$$

$$l = \begin{cases} 5, 6 & \text{if } n_s \bmod 2 = 0 \text{ and } N_{RB}^{max,DL} \leq 10 \\ 3, 5, 6 & \text{if } n_s \bmod 2 = 0 \text{ and } n_{PDCCH} \geq 11 \\ 1, 2, 3, 5, 6 & \text{if } n_s \bmod 2 = 1 \text{ and } (p = 0, 1) \\ 2, 3, 5, 6 & \text{if } n_s \bmod 2 = 1 \text{ and } (p = 0, 1, 2, 3) \end{cases}$$

$$m = 0, 1, \ldots, 2 \cdot N_{RB}^{PRS} - 1$$

$$m' = m + N_{RB}^{max,DL} - N_{RB}^{PRS}$$

wherein, $N_{RB}^{max,DL}$ is the maximum downlink bandwidth; and when the cyclic prefix of the system is an extended cyclic prefix:

$$k = 6m + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (p = 0, 1) \\ 2, 4, 5 & \text{if } n_s \bmod 2 = 1 \text{ and } (p = 0, 1, 2, 3) \end{cases}$$

$$m = 0, 1, \ldots, 2 \cdot N_{RB}^{PRS} - 1$$

$$m' = m + N_{RB}^{max,DL} - N_{RB}^{PRS}$$

wherein $v_{shift} = N_{Cell}^{ID} \bmod 6$.

The present invention also provides a device for sending PRSs, which is used to implement the method for sending PRSs described in Embodiment 1 of the aforementioned method. The device comprises a sending module which is used to send data carried by a PDCCH on a same physical resource and send no PRSs on the same physical resource, when the PRSs and the data carried by the PDCCH are required to be sent on the same physical resource.

The present invention also provides a device for sending data, which is used to implement the method for sending data described in Embodiment 2 of the aforementioned method. The device comprises a sending module which is used to send PRSs on a same physical resource and send no data carried by a PDCCH on the same physical resource, when the PRSs and the data carried by the PDCCH are required to be sent on the same physical resource.

The present invention also provides a device for sending PRSs, which is used to implement the method for sending PRSs described in Embodiment 3 of the aforementioned method. The device comprises: a sending module, which is used to send PRSs over predefined symbols in a subframe, wherein when a system adopts a normal cyclic prefix, a physical broadcast channel (PBCH) adopts single-antenna or double-antenna ports for transmission and the system bandwidth is less than or equal to 10 resource blocks, the predefined symbols comprise at least one of the following: the sixth OFDM symbol, the seventh OFDM symbol, the ninth OFDM symbol, the tenth OFDM symbol, the eleventh OFDM symbol, the thirteenth OFDM symbol, and the fourteenth OFDM symbol; and when a system adopts a normal cyclic prefix, a physical broadcast channel (PBCH) adopts four-antenna ports for transmission and the system bandwidth is less than or equal to 10 resource blocks, the predefined symbols comprise at least one of the following: the sixth OFDM symbol, the seventh OFDM symbol, the tenth OFDM symbol, the eleventh OFDM symbol, the thirteenth OFDM symbol, and the fourteenth OFDM symbol.

Preferably, when the system adopts a normal cyclic prefix and the system bandwidth is less than or equal to 10 resource blocks, or when data carried by a PDCCH are sent over the first 4 OFDM symbols in the subframe sending the PRSs, or when the PRSs are sent in a relay backhaul type subframe, the PRSs are sent by using the aforementioned device for sending PRSs.

The present invention also provides a device for sending data, which is used to implement the method for sending data described in Embodiment 4 of the aforementioned method. The device comprises: a sending module, which is used to send data carried by a PDCCH over the first n OFDM symbols in a subframe, wherein, for a non-MBSFN subframe, when a system adopts a normal cyclic prefix, the system bandwidth is less than or equal to 10 resource blocks and the subframe comprises PRSs to be sent, n is 2 or 3.

The present invention also provides a device for receiving data, which is used to implement the method for receiving data described in Embodiment 5 of the aforementioned method. The device comprises: a receiving module, which is used to only receive predefined data when a sending end sends PRSs and data carried by a PDCCH on a same physical resource at the same time, wherein the predefined data is the PRSs or the data carried by the PDCCH. That is to say, a UE may assume that there is no PRS to be sent on the resource, or a UE may assume that there is no PDCCH to be sent on the resource.

In summary of the above, the solution provided by the embodiments of the present invention can solve the problem that the physical downlink control channel is in conflict with the PRSs, thereby ensuring the overall performance of the system.

It should be noted that, the step as shown in the flow chart in the drawings may be executed in a computer system such as a set of computer-executable instructions. Moreover, although the logical order is shown or described in the flow chart, in certain circumstances, the step shown or described may be executed in a different order.

Obviously, those skilled in the art should clearly know that, the modules and steps of the present invention as above may be realized by a universal computing device, and they may be concentrated on an individual computing device or distributed on a network comprising multiple computing devices, and optionally, they may be realized by program codes which may be executed by a computing device, so they may be stored in a storage device to be executed by a computing device, or they may be respectively made into integrated circuit modules, or several modules or steps among them may be made into a single integrated circuit module. Thus, the present invention is not limited to the combination of any specific software and hardware.

The foregoing descriptions are exemplary embodiments of the present invention and are not intended to limit the present invention. Various changes and modifications of the present invention are available to those skilled in the art. All modifications, identical replacements and improvements made without departing from the spirit and principle of the present invention shall be within the protection scope of the present invention.

The invention claimed is:

1. A method for sending Positioning Reference Signals (PRSs), being applied in a Long Term Evolution (LTE) system, comprising:
   Sending the PRSs over predefined symbols in a subframe, wherein:
   the predefined symbols comprise: the sixth Orthogonal Frequency Division Multiplexing (OFDM) symbol, the seventh OFDM symbol, the ninth OFDM symbol, the tenth OFDM symbol, the eleventh OFDM symbol and the fourteenth OFDM symbol, in a case that: the LTE system adopts normal cyclic prefix, a Physical Broadcast Channel (PBCH) adopts single-antenna or double-antenna ports for transmission, and a bandwidth of the LTE system is less than or equal to 10 resource blocks; and
   the predefined symbols comprise: the sixth OFDM symbol, the seventh OFDM symbol, the tenth OFDM symbol, the eleventh OFDM symbol, the thirteenth OFDM symbol and the fourteenth OFDM symbol, in a case that: when the LTE system adopts normal cyclic prefix, the PBCH adopts four-antenna ports for transmission, and the bandwidth of the LTE system is less than or equal to 10 resource blocks.

2. A method for sending data, being applied in a Long Term Evolution (LTE) system, comprising:
   sending data carried by a Physical Downlink Control Channel (PDCCH) only over first two or three Orthogonal Frequency Division Multiplexing (OFDM) symbols in non-Multicast Broadcast Single Frequency Network (MBSFN) subframes configured with positioning reference signals, in a case that: the LTE system adopts normal cyclic prefix, and a bandwidth of the LTE system is less than or equal to 10 resource blocks;
   wherein the positioning reference signals are sent over the following OFDM symbols when a Physical Broadcast Channel (PBCH) adopts single-antenna or double-antenna ports for transmission: the fourth OFDM symbol, the sixth OFDM symbol, the seventh OFDM symbol, the ninth OFDM symbol, the tenth OFDM symbol, the eleventh OFDM symbol, the thirteenth OFDM symbol, and the fourteenth OFDM symbol; and
   wherein the positioning reference signals are sent over the following OFDM symbols when the PBCH adopts four-antenna ports for transmission: the fourth OFDM symbol, the sixth OFDM symbol, the seventh OFDM symbol, the tenth OFDM symbol, the eleventh OFDM symbol, the thirteenth OFDM symbol, and the fourteenth OFDM symbol.

3. A device for sending Positioning Reference Signals (PRSs), being applied in a Long Term Evolution (LTE) system, comprising a processor and a memory, the memory storing computer-readable instructions that, when executed by the processor, cause the device to send the PRSs over predefined symbols in a subframe; wherein:
   the predefined symbols comprise: the sixth Orthogonal Frequency Division Multiplexing (OFDM) symbol, the seventh OFDM symbol, the ninth OFDM symbol, the tenth OFDM symbol, the eleventh OFDM symbol and the fourteenth OFDM symbol, in a case that: the LTE system adopts normal cyclic prefix, a Physical Broadcast Channel (PBCH) adopts single-antenna or double-antenna ports for transmission, and a bandwidth of the LTE system is less than or equal to 10 resource blocks; and
   the predefined symbols comprise: the sixth OFDM symbol, the seventh OFDM symbol, the tenth OFDM symbol, the eleventh OFDM symbol, the thirteenth OFDM symbol and the fourteenth OFDM symbol, in a case that: the LTE system adopts normal cyclic prefix, the PBCH adopts four-antenna ports for transmission and the bandwidth of the LTE system is less than or equal to 10 resource blocks.

4. A device for sending data, being applied in a Long Term Evolution (LTE) system, comprising a processor and a memory, the memory storing computer-readable instructions that, when executed by the processor, cause the device to send data carried by a Physical Downlink Control Channel (PDCCH) only over first two or three Orthogonal Frequency Division Multiplexing (OFDM) symbols in non-Multicast Broadcast Single Frequency Network (MBSFN) subframes configured with positioning reference signals, in a case that: the LTE system adopts normal cyclic prefix, and a bandwidth of the LTE system is less than or equal to 10 resource blocks;
   wherein the positioning reference signals are sent over the following OFDM symbols when a Physical Broadcast Channel (PBCH) adopts single-antenna or double-antenna ports for transmission: the fourth OFDM symbol, the sixth OFDM symbol, the seventh OFDM symbol, the ninth OFDM symbol, the tenth OFDM symbol, the eleventh OFDM symbol, the thirteenth OFDM symbol, and the fourteenth OFDM symbol; and
   wherein the positioning reference signals are sent over the following OFDM symbols when the PBCH adopts four-antenna ports for transmission: the fourth OFDM symbol, the sixth OFDM symbol, the seventh OFDM symbol, the tenth OFDM symbol, the eleventh OFDM symbol, the thirteenth OFDM symbol, and the fourteenth OFDM symbol.

* * * * *